United States Patent [19]

Kubät et al.

[11] 4,177,103
[45] Dec. 4, 1979

[54] APPARATUS FOR THE PREPARATION OF A MULTILAYER FILM

[75] Inventors: Josef Kubät, Solna; Kenneth S. Berggren, Mölndal, both of Sweden

[73] Assignee: Celloplast AB Norrkoeping, Norrköping, Sweden

[21] Appl. No.: 830,579

[22] Filed: Sep. 6, 1977

Related U.S. Application Data

[60] Division of Ser. No. 630,786, Nov. 11, 1975, Pat. No. 4,076,568, which is a continuation of Ser. No. 448,640, Mar. 4, 1974, abandoned.

[30] Foreign Application Priority Data

Mar. 16, 1973 [SE] Sweden .............................. 7303751

[51] Int. Cl.$^2$ ...................... B30B 11/22; B31B 31/30; B29D 23/04
[52] U.S. Cl. .................................... 156/500; 156/229; 156/244.14; 264/515; 425/133.1
[58] Field of Search .................. 156/244, 500; 264/93, 264/94, 95, 176 R, 209; 425/114, 133.1, 326.1

[56] References Cited

U.S. PATENT DOCUMENTS

| | | | |
|---|---|---|---|
| 2,753,596 | 7/1956 | Bailey | 156/500 |
| 2,957,201 | 10/1960 | Fields et al. | 425/133.1 |
| 3,726,743 | 4/1973 | Reifenhauser | 264/95 |
| 3,926,706 | 12/1975 | Reifenhäuser et al. | 264/95 |

FOREIGN PATENT DOCUMENTS

| | | |
|---|---|---|
| 1043138 | 9/1966 | United Kingdom. |
| 1264972 | 2/1972 | United Kingdom. |
| 1270442 | 4/1972 | United Kingdom. |
| 1278549 | 6/1972 | United Kingdom. |

Primary Examiner—Caleb Weston
Attorney, Agent, or Firm—Brumbaugh, Graves, Donohue & Raymond

[57] ABSTRACT

A continuous process for preparation of a multilayer film from thermoplastic material comprising processing in an extruder, feeding into a film blowing die having several concentric slots, stretching, blowing, bonding and winding up wherein the layers are bonded together when the exterior layer has been oriented to the desired extent in the longitudinal direction by stretching and the interior layer in the transverse direction by blowing by means of gas medium and, optionally, in the longitudinal direction by stretching, but before any of the material layers has been cooled to a temperature which corresponds to the frost point of the material in question and otherwise before any of the material has lost its viscous flowability, and wherein one or more interior layers may be used.

Furthermore, an apparatus for the performance of the above process is provided by means of which a double layer film is prepared.

3 Claims, 2 Drawing Figures

APPARATUS FOR THE PREPARATION OF A MULTILAYER FILM

This application is a division of our co-pending application Ser. No. 630,786 filed Nov. 11, 1975 now U.S. Pat. No. 4,076,568, which, in turn, was a continuation of application Ser. No. 448,640 filed Mar. 4, 1974, now abandoned.

The present invention relates to a continuous process for the preparation of multilayer film of thermoplastic materials and an apparatus for the performance of the process.

It is previously known to prepare multilayer plastic films by means of two or more extruders, a die head with several concentric annular slots, a blowing apparatus and a drawing apparatus. The materials from which the layers of said plastic films are prepared are thereby processed in the different extruders and then are passed separated to the different concentric slots the diameters of which are very close to each other. Thus, the emerging tubes which form the different layers of the final film laminate make contact with each other immediately after the leaving of the die and are blown united with each other. This means that the individual layers cannot be stretched in the longitudinal direction and the cross direction, respectively, independently of each other.

A process for the preparation of multilayer plastic sheets has been proposed in the German Offenlegungsschrift No. 1,950,824 in which process the individual layers to a certain extent can be oriented independently of each other. In said process the ratio between the diameter of the exterior tube to the diameter of the interior tube is essentially two to one and the different layers are stretched and expanded (oriented) to a different extent in the longitudinal and cross directions. When the two layers have been expanded and stretched they are cooled and thereafter brought into contact with each other and are joined together. Said joining takes place by means of adhesion promoting agents, chemical reactions in the slot between the tube dies or by other surface modifying measures for instance corona discharge. However, the film obtained has several deficiencies, it is inhomogeneous, a boundary layer is present and the linking obtained between the layers is not especially strong. Owing to the difference in the diameters of the exterior and interior slots (ratio 1:2) as best one can obtain an orientation difference between the two layers in the transverse direction of maximum 100%.

The present invention relates to a new continuous process by means of which it is possible to prepare a multilayer film having a very different orientation distribution between the interior and the exterior layers said layers being firmly bonded to each other without any visible boundary layer. Since the different layers of the film in the process according to the present invention can be oriented in different directions, the exterior layer in longitudinal directions and the interior layer essentially in the transverse direction and optionally in the longitudinal direction the tensile strength of the film can be improved in both directions while the elongation at break is decreased in the same directions as compared to a single film prepared of the same amounts of material.

The process according to the present invention is based on a new process technique which briefly is carried out so that the material(s) from which the film shall be prepared in a conventional manner is (are) processed in one or several extruders and then is (are) fed into a film blowing die having several concentric annular slots with different diameters. When the material layers which are thereby formed emerge from their different slots the exterior layer, if desired, stretched in the longitudinal direction while the interior layer(s) is (are) expanded in the transverse direction and optionally is (are) stretched in the longitudinal direction. Then the layers are brought together by the expansion of the interior layer(s) in the transverse direction. In doing so a continuous bonding of the layers takes place when these are brought into contact with each other before any of the materials of the layers has been cooled so that it has passed its frost point or otherwise lost its viscous flowability which makes such a bonding possible. Then the film is drawn and wound up by means of usual drawing and winding machines.

By means of the new process according to the invention it has for the first time been possible to prepare a homogeneous multilayer film without a visible boundary layer but with essentially different orientation distribution in the interior and exterior layers in a simple and economical manner, which film as compared to a single film of the same thickness has considerably improved properties in several respects, such as increased tensile strength, decreased elongation at break, and absence of "pin-holes" and in which film the layers are firmly bonded. Said results are made possible by orienting the exterior layer in the longitudinal direction while the interior layer is oriented in the transverse direction and optionally in the longitudinal direction and the layers thus oriented are brought into contact with each other while they still are at such a high temperature that they have not yet passed their frost point or otherwise lost their viscous flowability. It is surprising and unexpected that the layers of material can be bonded at such a high temperature without loss of their orientation in the longitudinal and the transverse direction, respectively. Thus, the process according to the invention results in a multilayer film with firmly bonded layers having a very different orientation distribution in the layers.

The invention also relates to an apparatus for the performance of the above mentioned process for the preparation of a double layer film with the use of only one starting material for the two layers. The apparatus according to the invention comprises, as is previously known in the preparation of blown films, an extruder, a film blowing machine including a film blowing die and drawing and winding machines. The characteristic feature of the apparatus is the film blowing die in which the liquid material stream coming from the extruder is divided so that one part of the material stream is led to a cylindrical interior slot and one part to a cylindrical exterior slot which slots are concentric and have a considerable difference in diameter.

Figure 1:
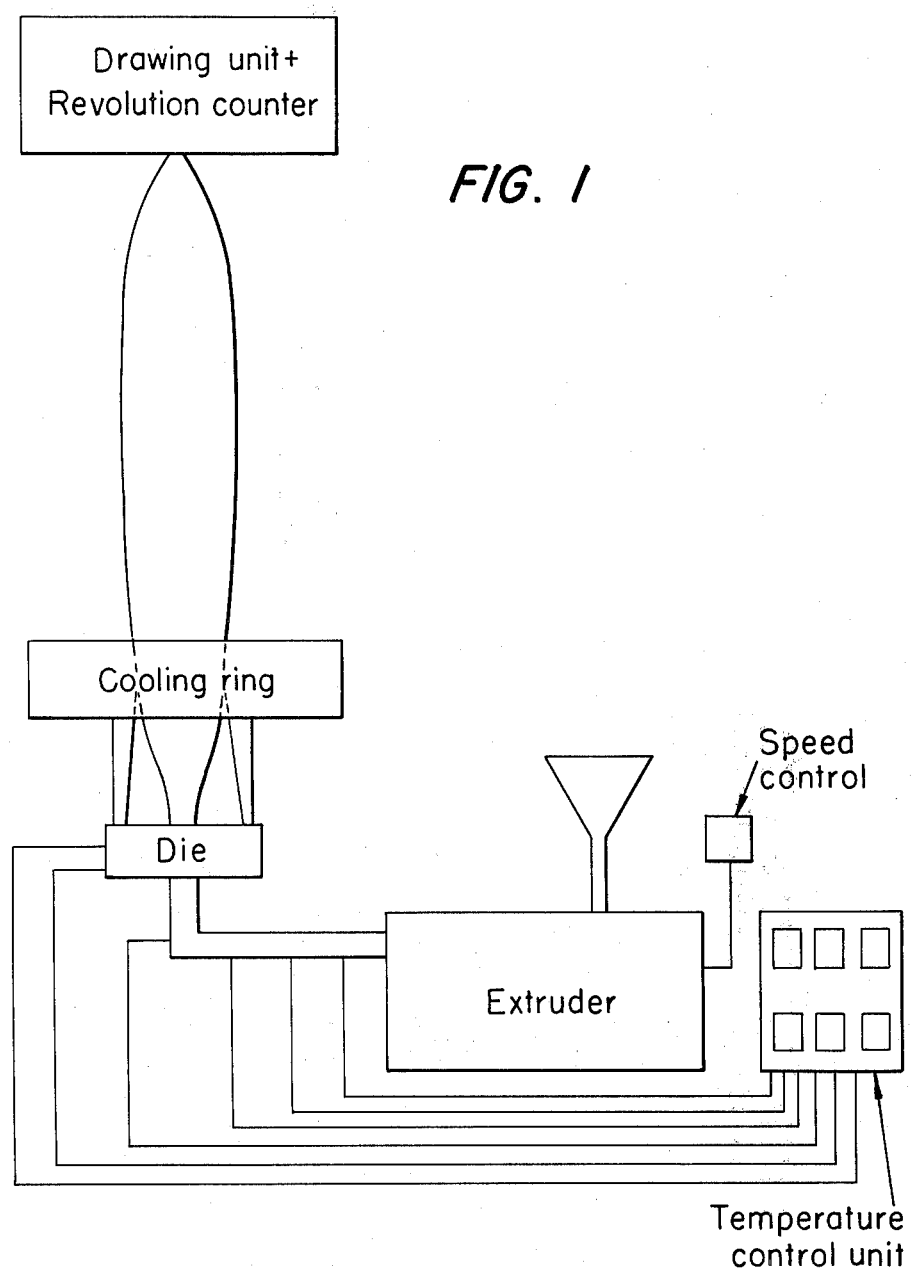
FIG. 1 illustrates an extruder apparatus comprising a cooling ring and drawing and winding machines as are well known in the film blowing art.

The process according to the invention consists in that the material(s) from which the film layers shall be made is (are) processed in one or more extruders and then is (are) fed into a film blowing die which contains concentric slots with different diameters. Then, if desired, the material which is fed through the exterior slot is stretched in the longitudinal direction (MD) while the material which is fed through the interior slot is blown up by means of super atmospheric pressure, such as by means of gas, for instance air, nitrogen, argon or the like, and thereby is expanded in the transverse direction (TD) and furthermore, optionally, is stretched in the longitudinal direction (MD). The tubular layers are brought together in that the diameter of the inner layer(s) is increased by means of the gas inlet. The tubular layers are then bonded before any of the materials in the layer has passed its frost point or otherwise lost their viscous flowability, i.e. while the materials still are so hot that they fuse together and form a single film without any visible boundary layer. The cooling of the film is carried out with a cooling ring and drawing and winding of the film then takes place by means of drawing and winding machines in a manner which is well known in the film blowing art (FIG. 1).

In order to obtain a double film having considerably improved strength properties in both directions the diameter ratio between the exterior and interior slots shall be between about 3:1 and 10:1. Especially advantageous results are obtained at diameters ratio within the range of from 4:1 to 10:1. By stretching of the exterior layer in the longitudinal direction said layer can be oriented in said direction and it is possible, if desired, to provide a considerable difference between the exterior and interior layers as to orientation in longitudinal direction. Thus, the two layers can be provided with a degree of orientation which is of the same size the orientation directions subtending at an angle of 90° with each other.

The process according to the present invention can be carried out with the use of different materials in the layers or with the use of the same material in the layers. The materials which are used in the process are thermoplastic resins. Illustrative examples of suitable thermoplastic resins are polyethylene, polypropylene, polyamides, ethylene-EVA copolymers and others.

When using different materials in the layers one utilizes several extruders feeding the different slots of the die. When using the same material in the interior and exterior layers of a double layer film the apparatus according to the present invention makes it possible to use only one extruder feeding the film blowing die.

It is also possible to insert between the film layers before these are connected different filling materials, such as wood flour, chalk, carbon black and similar materials, magnetic and metallic materials which can be oriented in magnetic or electrostatic fields for obtaining pattern effects etc., so as to affect the different properties of the film such as mechanical properties, for instance stiffness, appearance properties, price etc. Since the film layers are in a melted condition when the filling materials are injected a final product is obtained in which the filling material is homogeneously distributed but in which final product the layers in spite of the presence of the filling material are firmly and intimately connected.

Figure 2:
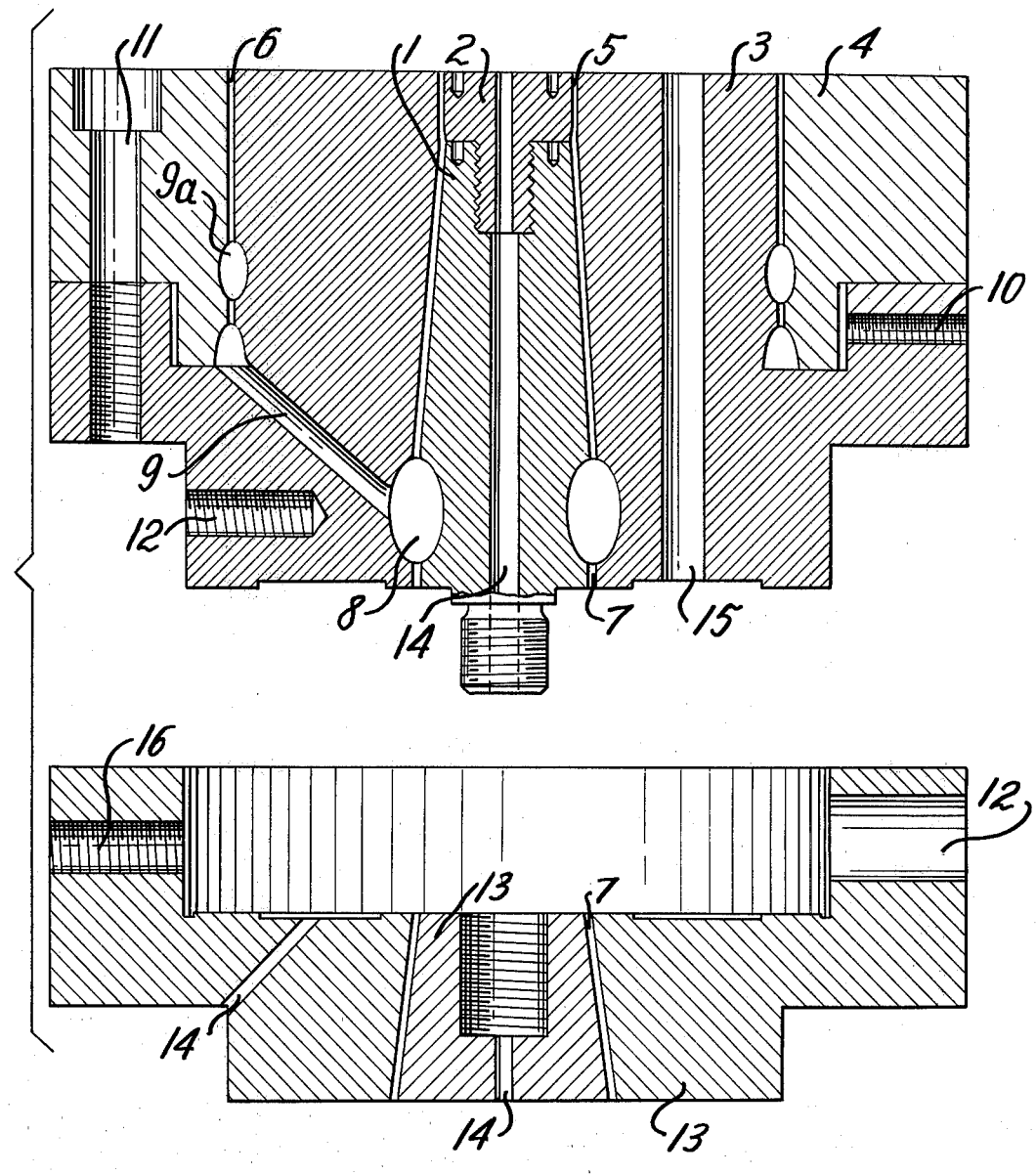
FIG. 2 illustrates an apparatus comprising a film blowing die having die slots as in the instant invention.

An apparatus according to the invention with a film blowing die which is used in the preparation of a double layer film of one single starting material is illustrated in FIG. 2. Thus, in this embodiment of the invention the material is fed from an extruder to a die which essentially consists of an inner cone (1) an intermediate part (3) and an outer ring (4). The material flow, the plastic melt, comes from the extruder and is fed into the die through a feed slot (7) through which it passes up to an enlargement (8) of the feed slot. At said point the flow is divided into the two different slots. One flow passes up around the inner cone and further to the interior slot while the other flow passes through a number of distribution channels (9) to an enlargement (9a) and further to the exterior slot (6). The interior slot (5) and the exterior slot (6) are separately centerable and it is suitable that the cone top (2) is interchangeable which makes its possible to change the width of the interior slot. Said cone top can also have a conical shape which makes it possible to carry out a continuous adjustment of the slot breadth. The same thing is applicable to the exterior slot. Gas is fed to the inner layer through a gas channel (14) which passes through the inner cone and through the cone top. It is also possible to adjust the pressure between the layers by means of a channel (15) in the intermediate part.

Thus, the plastic material is forced from below up into the feed slot between the inner cone and the intermediate part. In order to avoid weakening weld lines the plastic is allowed to flow around the inner cone in an enlargement of the feed slot and then it flows out through the interior slot which is formed between the cone top and the intermediate part. From the enlargement of the feed slot the plastic material also flows to the exterior slot through several tubular channels. Also in the exterior slot which is formed between the intermediate part and the outer ring the flow is homogenized by allowing the plastic material to flow around in enlargements of the slot before it passes the exterior slot.

The invention is further illustrated by means of the following example.

EXAMPLE

A double layer film of Unifos LDpolyethylene, grade DFDS-6600, melt index 0.3 gr/10 minutes, was prepared with an extruder and a film blowing die with two concentric ring slots using the following conditions:

| | |
|---|---|
| Diameter of the interior slot | = 30 mm |
| Diameter of the exterior slot | = 130 mm |
| Thickness of the film | = 23 μm |
| Drawing speed | = 10 m/minute |
| Breadth of the interior slot | = 0.4 mm |
| Breadth of the exterior slot | = 0.6 mm |

The film obtained then was tested according to ASTM standards as to tensile strength, elongation and "dartdrop". As a comparison a single film was also prepared having the same thickness and during otherwise the same conditions as the double layer film. The results obtained for the two films are summarized in Table I.

Table I.

| | Tensile strength | | Elongation ASTM-D-882 | | Dartdrop ASTM-D-1709 |
|---|---|---|---|---|---|
| | MD | TD kp/cm$^2$ | MD % | TD % | gram |
| Single film | 220 | 190 | 400 | 600 | 150 |
| Double film | 392 | 308 | 260 | 480 | 140 |

What we claim is:

1. An apparatus comprising an extruder, a film blowing die and a drawing and winding means wherein the film blowing die comprises an inner cone, an intermediate part, an outer ring, at least two concentric slots situated in the same plane, the exterior concentric slot being formed between the intermediate part and the outer ring and having a diameter at least four times larger than the diameter of the interior concentric slot formed between the inner cone and the intermediate part, a feed slot for introducing a plastic melt material from the extruder into the blowing die, a portion of the feed slot being enlarged and designed to divide the plastic melt material between said interior slot and channels communicating with the exterior slot, said channels having enlarged portions in relation to the exterior slot, and a gas channel formed in the inner cone.

2. An apparatus according to claim 1, wherein a gas channel is formed in the intermediate part of the blowing die.

3. An apparatus according to claim 1, wherein the diameter ratio between the exterior and interior slots is between 4:1 and 10:1.

* * * * *

UNITED STATES PATENT AND TRADEMARK OFFICE
CERTIFICATE OF CORRECTION

PATENT NO. : 4,177,103
DATED : December 4, 1979
INVENTOR(S) : Josef Kubåt et al.

It is certified that error appears in the above-identified patent and that said Letters Patent are hereby corrected as shown below:

Column 1, line 48, "as" should read --at--.

Column 4, line 35, "LDpolyethylene" should read --LD-polyethylene--

Signed and Sealed this

Twenty-fifth Day of March 1980

[SEAL]

Attest:

SIDNEY A. DIAMOND

Attesting Officer

Commissioner of Patents and Trademarks